(12) United States Patent
Maddah-Ali et al.

(10) Patent No.: US 8,488,728 B2
(45) Date of Patent: Jul. 16, 2013

(54) X-MIMO SYSTEMS WITH MULTI-TRANSMITTERS AND MULTI-RECEIVERS

(75) Inventors: Mohammad Ali Maddah-Ali, Piscataway, NJ (US); Seyed Abolfazi Motahari, Kitchener (CA); Amir Khandani, Kitchener (CA); Mohammadhadi Baligh, Kanata (CA); Ming Jia, Ottawa (CA); Jianglei Ma, Kanata (CA); Peiying Zhu, Katana (CA); Wen Tong, Ottawa (CA)

(73) Assignee: Research In Motion Limited, Ontario (CA)

( * ) Notice: Subject to any disclaimer, the term of this patent is extended or adjusted under 35 U.S.C. 154(b) by 0 days.

(21) Appl. No.: 13/620,741

(22) Filed: Sep. 15, 2012

(65) Prior Publication Data
US 2013/0010840 A1 Jan. 10, 2013

Related U.S. Application Data

(63) Continuation of application No. 12/806,209, filed on Sep. 24, 2009, now Pat. No. 8,340,235.

(60) Provisional application No. 61/100,118, filed on Sep. 25, 2008.

(51) Int. Cl.
*H04B 1/10* (2006.01)

(52) U.S. Cl.
USPC .......................................................... 375/350

(58) Field of Classification Search
None
See application file for complete search history.

(56) References Cited

U.S. PATENT DOCUMENTS

2011/0299617 A1* 12/2011 Maddah-Ali et al. ......... 375/267

* cited by examiner

*Primary Examiner* — Khanh C Tran

(57) ABSTRACT

A method and apparatus for transmitting and receiving a wireless transmission of a plurality of data streams in a wireless communication system having a plurality of nodes is disclosed. Each node has multiple antennas. The method involves receiving first and second data streams from respective first and second nodes at a receiver node, causing the receiver node to generate a receive filter for decoding each of the received data streams, and causing the receiver node to transmit receive filter information for each of the first and second data streams, the receive filter information facilitating precoding of the first and second data streams for simultaneous transmission within a common frequency band to the receiver node.

14 Claims, 17 Drawing Sheets

X-MIMO SYSTEMS WITH MULTI-TRANSMITTERS AND MULTI-RECEIVERS

CROSS-REFERENCE TO RELATED APPLICATIONS

This application claims the benefit of U.S. provisional patent application 61/100,118, filed on Sep. 25, 2008.

MICROFICHE APPENDIX

Not applicable.

TECHNICAL FIELD

This application relates to wireless communication techniques in general, and to a techniques of the present disclosure, in particular.

SUMMARY

Aspects and features of the present application will become apparent to those ordinarily skilled in the art upon review of the following description of specific embodiments of the disclosure in conjunction with the accompanying drawing figures.

BRIEF DESCRIPTION OF THE DRAWINGS

Embodiments of the present application will now be described, by way of example only, with reference to the accompanying drawing figures, wherein.

Like reference numerals are used in different figures to denote similar elements.

DETAILED DESCRIPTION OF THE DRAWINGS

Wireless System Overview

Figure 1:
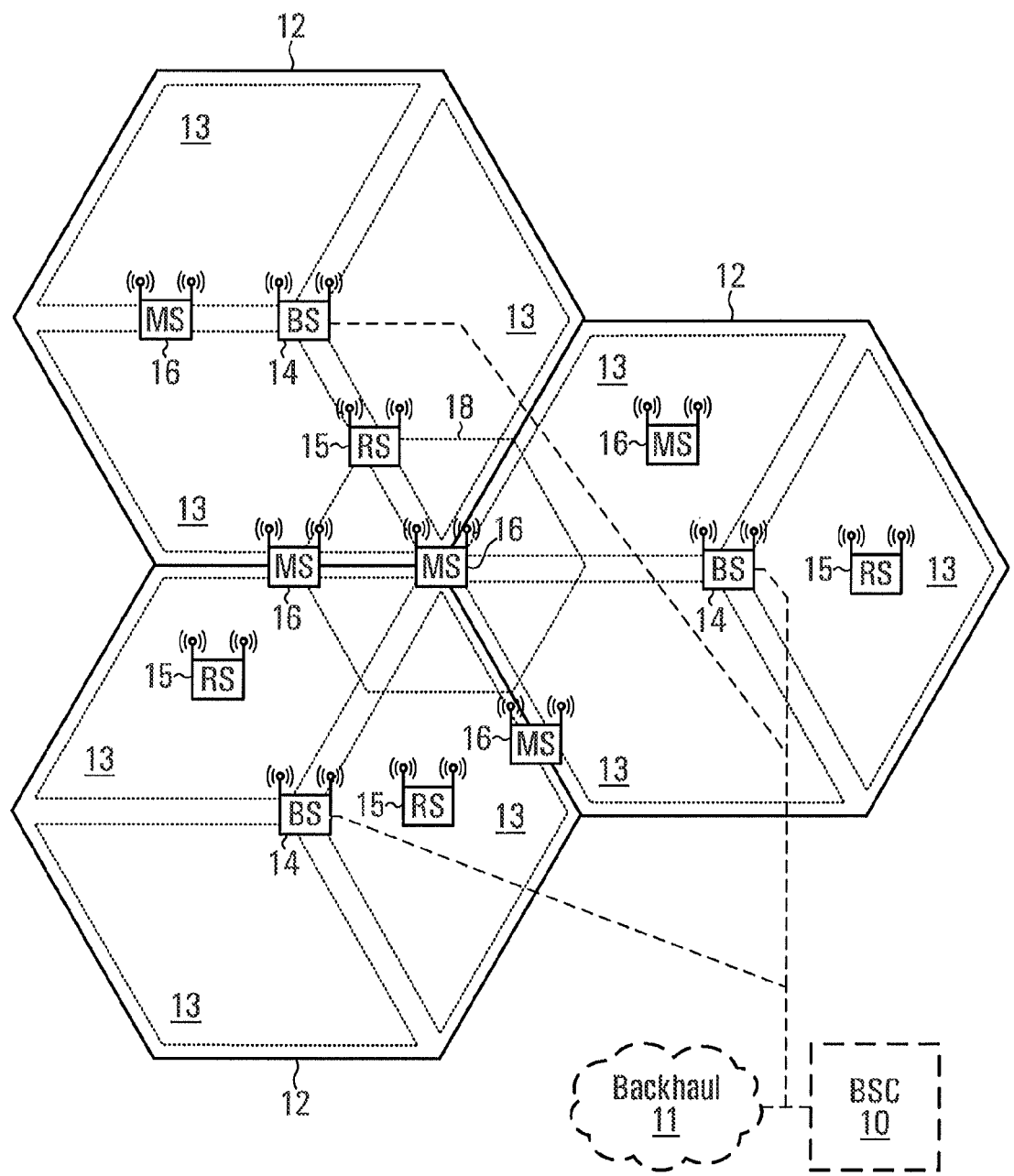
FIG. 1 is a block diagram of a cellular communication system.

Referring to the drawings, FIG. 1 shows a base station controller (BSC) 10 which controls wireless communications within multiple cells 12, which cells are served by corresponding base stations (BS) 14. In some configurations, each cell is further divided into multiple sectors 13 or zones (not shown). In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications. In some configurations, relay stations 15 may assist in communications between base stations 14 and wireless terminals 16. Wireless terminals 16 can be handed off 18 from any cell 12, sector 13, zone (not shown), base station 14 or relay 15 to an other cell 12, sector 13, zone (not shown), base station 14 or relay 15. In some configurations, base stations 14 communicate with each and with another network (such as a core network or the internet, both not shown) over a backhaul network 11. In some configurations, a base station controller 10 is not needed.

Figure 2:
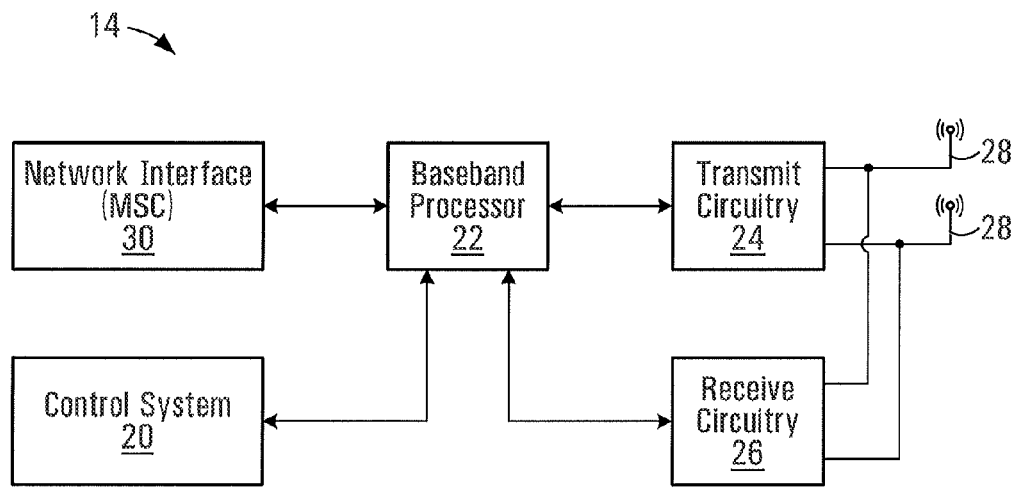
FIG. 2 is a block diagram of an example base station that might be used to implement some embodiments of the present 5 application.

With reference to FIG. 2, an example of a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
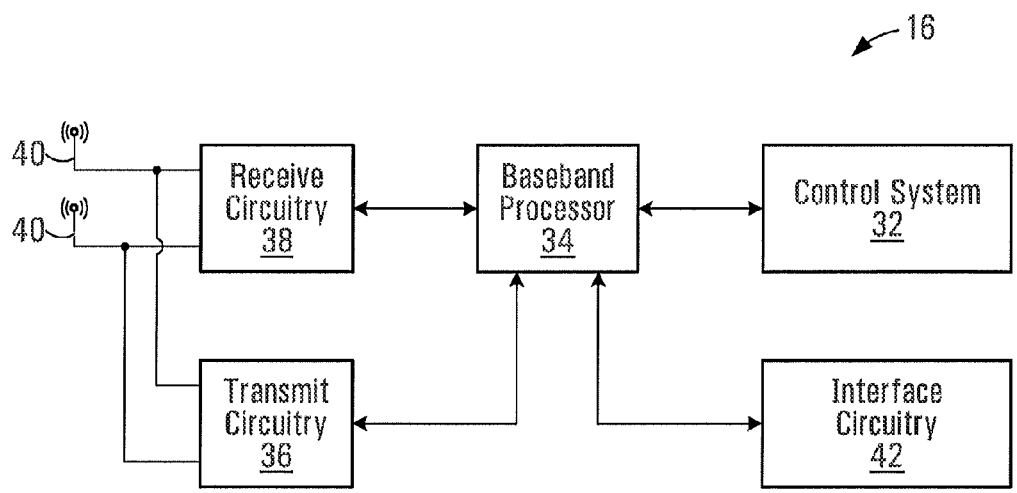
FIG. 3 is a block diagram of an example wireless terminal that might be used to implement some embodiments of the present application.

With reference to FIG. 3, an example of a mobile terminal 16 is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided, by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28 ($n \geq 1$), and each mobile terminal 16 is equipped with "m" receive antennas 40 ($m \geq 1$). Notably, the respective antennas can be used for reception and transmission using appropriate duplexers or switches and are so labeled only for clarity.

When relay stations 15 are used, OFDM is preferably used for downlink transmission from the base stations 14 to the relays 15 and from relay stations 15 to the mobile terminals 16.

Figure 4:
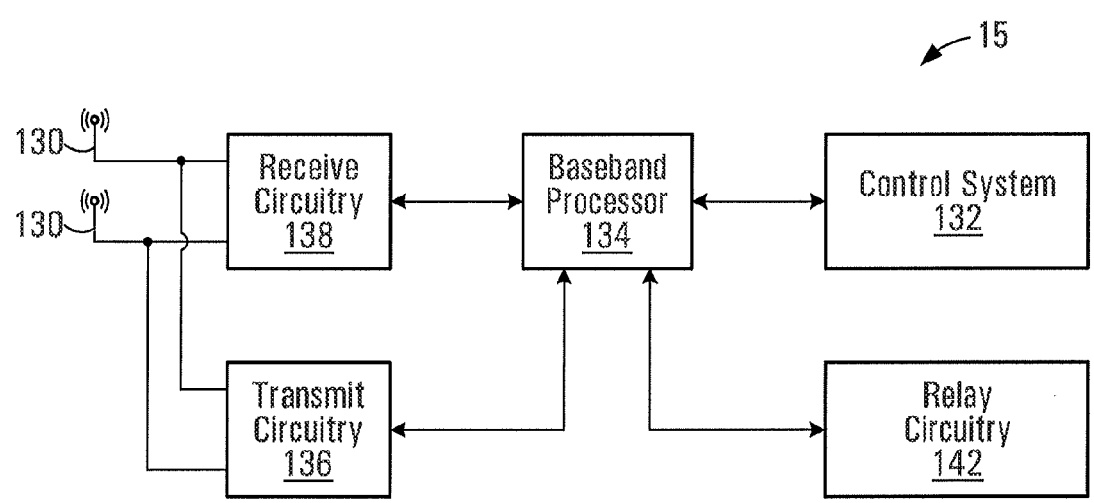
FIG. 4 is a block diagram of an example relay station that might be used to implement some embodiments of the present application.

With reference to FIG. 4, an example of a relay station 15 is illustrated. Similarly to the base station 14, and the mobile terminal 16, the relay station 15 will include a control system 132, a baseband processor 134, transmit circuitry 136, receive circuitry 138, multiple antennas 130, and relay circuitry 142. The relay circuitry 142 enables the relay 14 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

Figure 5:
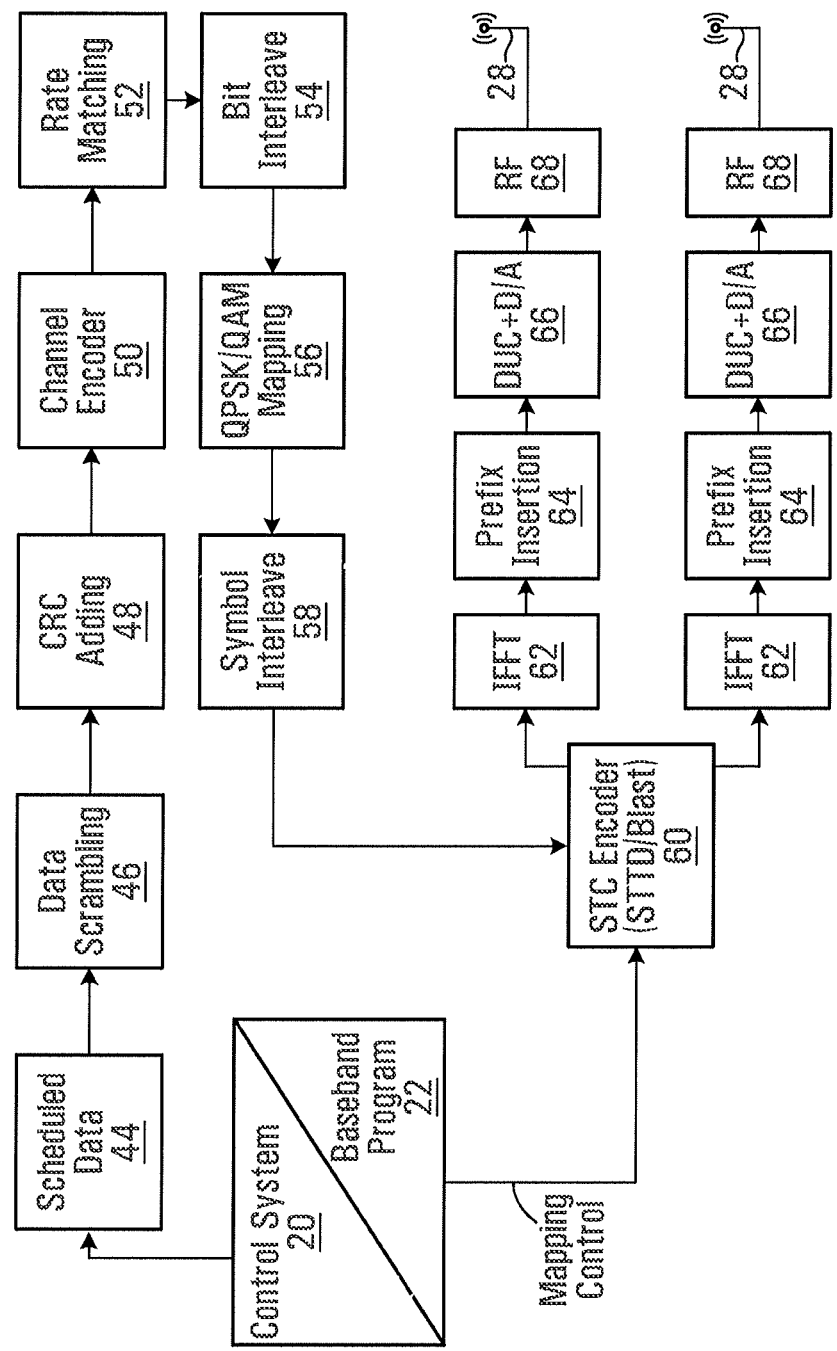
FIG. 5 is a block diagram of a logical breakdown of an example OFDM transmitter architecture that might be used to implement some embodiments of the present application.

With reference to FIG. 5, a logical OFDM transmission architecture will be described. Initially, the base station controller 10 will send data to be transmitted to various mobile terminals 16 to the base station 14, either directly or with the assistance of a relay station 15. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 6:
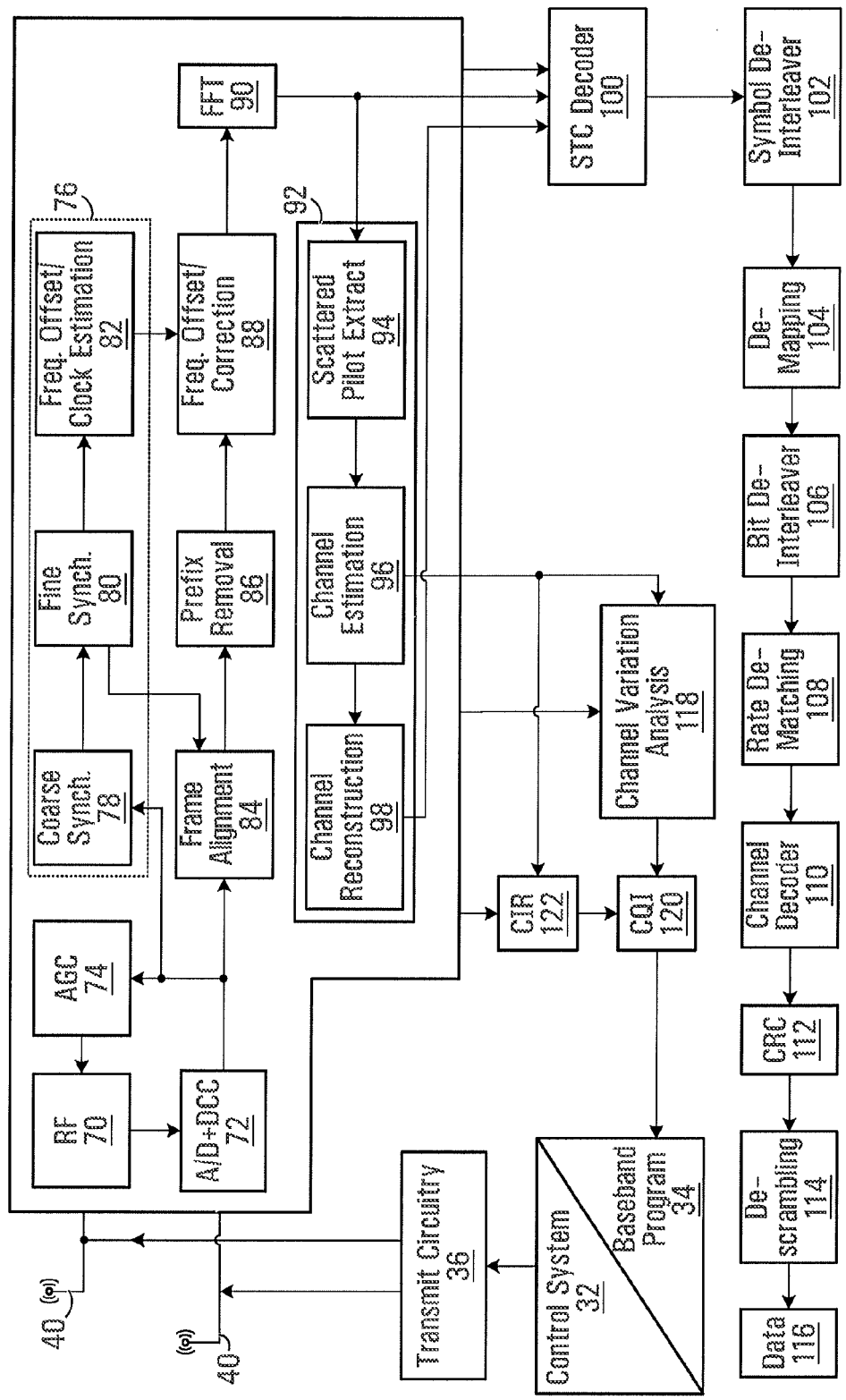
FIG. 6 is a block diagram of a logical breakdown of an example OFDM receiver architecture that might be used to implement some embodiments of the present application.

Reference is now made to FIG. 6 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

Figure 7A:
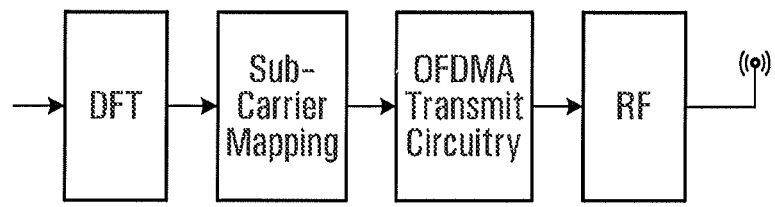
FIG. 7(a) is an example SC-FDMA transmitter for single-in single-out (SISO) configuration provided in accordance with one embodiment of the present application.
Figure 7B:
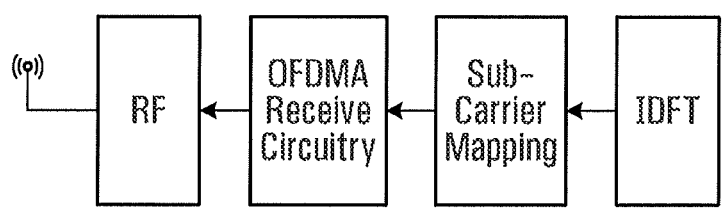
FIG. 7(b) is an example SC-FDMA receiver for SISO configuration provided in accordance with the embodiment of FIG. 7(a)

Referring to FIG. 7, an example SC-FDMA transmitter 7(a) and receiver 7(b) for single-in single-out (SISO) configuration is illustrated provided in accordance with one embodiment of the present application. In SISO, mobile stations transmit on one antenna and base stations and/or relay stations receive on one antenna, FIG. 7 illustrates the basic signal processing steps needed at the transmitter and receiver for the LTE SC-FDMA uplink. In some embodiments, SC-FDMA (Single-Carrier Frequency Division Multiple Access) is used. SC-FDMA is a modulation and multiple access scheme introduced for the uplink of 3GPP Long Term Evolution (LTE) broadband wireless fourth generation (4G) air interface standards, and the like. SC-FDMA can be viewed as a DFT pre-coded OFDMA scheme, or, it can be viewed as a single carrier (SC) multiple access scheme. There are several similarities in the overall transceiver processing of SC-FDMA and OFDMA. Those common aspects between OFDMA and SC-FDMA are illustrated in the OFDMA TRANSMIT CIRCUITRY and OFDMA RECEIVE CIRCUITRY, as they would be obvious to a person having ordinary skill in the art in view of the present specification. SC-FDMA is distinctly different from OFDMA because of the DFT pre-coding of the modulated symbols, and the corresponding IDFT of the demodulated symbols. Because of this pre-coding, the SC-FDMA sub-carriers are not independently modulated as in the case of the OFDMA sub-carriers. As a result, PAPR of SC-FDMA signal is lower than the PAPR of OFDMA signal. Lower PAPR greatly benefits the mobile terminal in terms of transmit power efficiency.

FIGS. 1 to 7 provide one specific example of a communication system that could be used to implement embodiments of the application. It is to be understood that embodiments of the application can be implemented with communications systems having architectures that are different than the specific example, but that operate in a manner consistent with the implementation of the embodiments as described herein.

Further details of embodiments of aspects of the present application are provided below.

The above-described and below-described embodiments of the present application are intended to be examples only. Those of skill in the art may effect alterations, modifications and variations to the particular embodiments without departing from the scope of the application.

Keywords for Searching:
MIMO
Multiple transmit and multiple receive antennas
Multiple transmitters and multiple receivers
Spatial multiplexing
Multi-user MIMO
Non-cooperative communications
Spectrum Sharing
Parallel relaying
Interference management
Network coding
Sofr handover
Mesh networking
Self-organized networks
WiFi
GiFi
Gigabit MIMO
Products that Will Use this Application:
Potoentially extendable to WiMAX and LTE
IEEE802.16m
IEEE802.11n
IEEE802.11VHT
IEEE802.15
Beyond 4G systems
IMT-advanced systems
Is this Application relevant to a Standards Activity? yes
If so, give details:
Plan to develop the next generation standard based on this concept
Especially IEEE802.16m and LTE-Advanced Technical Information Brief Description of the Application:
This Application configures more than one multi-antenna transmitter and more than one multi-antenna-receiver, each transmitter has the knowledge of the MIMO channels information and there is NO data-exchanging required between the transmitters (non cooperative transmission), there is NO data-exchanging in the receiver side. Linear pre-coding can be applied at transmitters and/or receivers. The transmit and receive per-coding/filtering is performed such that the dimension of the interference is minimized. This is core value of this Application, since we can minimized the number of transmit/receive antennas to achieve highest spectral efficiency, as an example, if we have 2 users each with 2 transmits, in the conventional receiver requires 4 receive antennas for each user in order to achieve multiplexing again of 4, with this Application, we only need 3 receive antennas for each user to achieve the same multiplexing again of 4 without penalty on the transmit power and bandwidth, this architecture is called X-MIMO. The basic scheme of X-MIMO can be generalized to many wireless/wireline appellation, such as multi-hop relay, total distributed MIMO networking.

Problem Solved by the Application:

This Application provides solutions for the following fundamental difficulties in distributed broadband wireless networking: e.g. (1) achieving the higher multiplexing gain without exchange the data at both transmitter side and receiver side, which no prior arts can do this, this is a major obstacle to enable disturbed multi-user communications (2) this scheme enable the relay node sharing between the multiple data path to support distinct source-destination routing, for example in MIMO downlink system, where more than one relay nodes and more than one receivers (3) to achieving a give multiplexing gain, this solution requires minimum number of transmit/receive antennas or (4) with the given number of transmit/receive antenna, this scheme achieve the maximum multiplexing gain.

Solutions that have been Tried and why they Didn't Work:

Two high cost alternative solutions to achieve the same performance are (1) Using an additional backbone system to connect transmitters or receivers which enable us to apply advance schemes such as dirty paper precoding (2) Using more than transmit/receive antennas.

For the first alternative, in many practical case the connections between transmits or receivers are not possible, for the second alternative, additional more antennas will be limited by the device form factor, both solutions are expensive.

Specific Elements or Steps that Solved the Problem and how they do it:

The basic elements of this Application are several multi-antenna transmitters and several multi-antenna receivers and associated pilots. The operational steps are the followings:

[1] Each transmitter sends the pilot for each antenna and the pilot for each transmitter is orthogonal.

[2] Each receiver estimates all the incoming MIMO channels and compute the specific receive filters and each receiver feeds back the compound filter and MIMO channel to via dedicated feedback channel to a specific transmitter

[3] Each transmitter computes the linear pre-coding filter based on such feedback information from the receiver

[4] Each transmitter sends the pre-coded data

[5] Each receiver demodulates the corresponding data from filtered receive signal Commercial Value of the Application to Nortel and Nortel's Major Competitors:

This Application can be used as Nortel-specific proparteiry implementation or it can be standardized in the next generation broadband wireless standards.

---

3GPP TSG-Ran Working Group 1 Meeting #54b R1-083870
Prague, Czech Republic, Sep. $29^{th}$-Oct. $3^{rd}$, 2008

Agenda Item: 11
Source: Nortel
Title: LTE-A Downlink Multi-site MIMO Cooperation
Document for: Discussion
1 Introduction

---

Cooperation between neighbouring sites in a LTE-A system improves coverage for the cell edge users as well as total cell throughput. In the LTE standard, such cooperation is limited and does not involve scheduling, data sharing or channel state information state exchange between the transmitters. There are several proposals to adopt multi-site cooperation techniques in the LTE-A standard [1-4]. In this contribution, we study different cooperation scenarios and propose some solutions for further study for possible exploiting in the LTE-A standard.

2 Cooperation Scenarios

Different system setups allow for different cooperation level. Data sharing, CSI sharing and antenna configuration are among the aspects for consideration in multi-site cooperation. Here, we study some aspects of the system that need to be considered for each cooperation technique.

Figure 8:
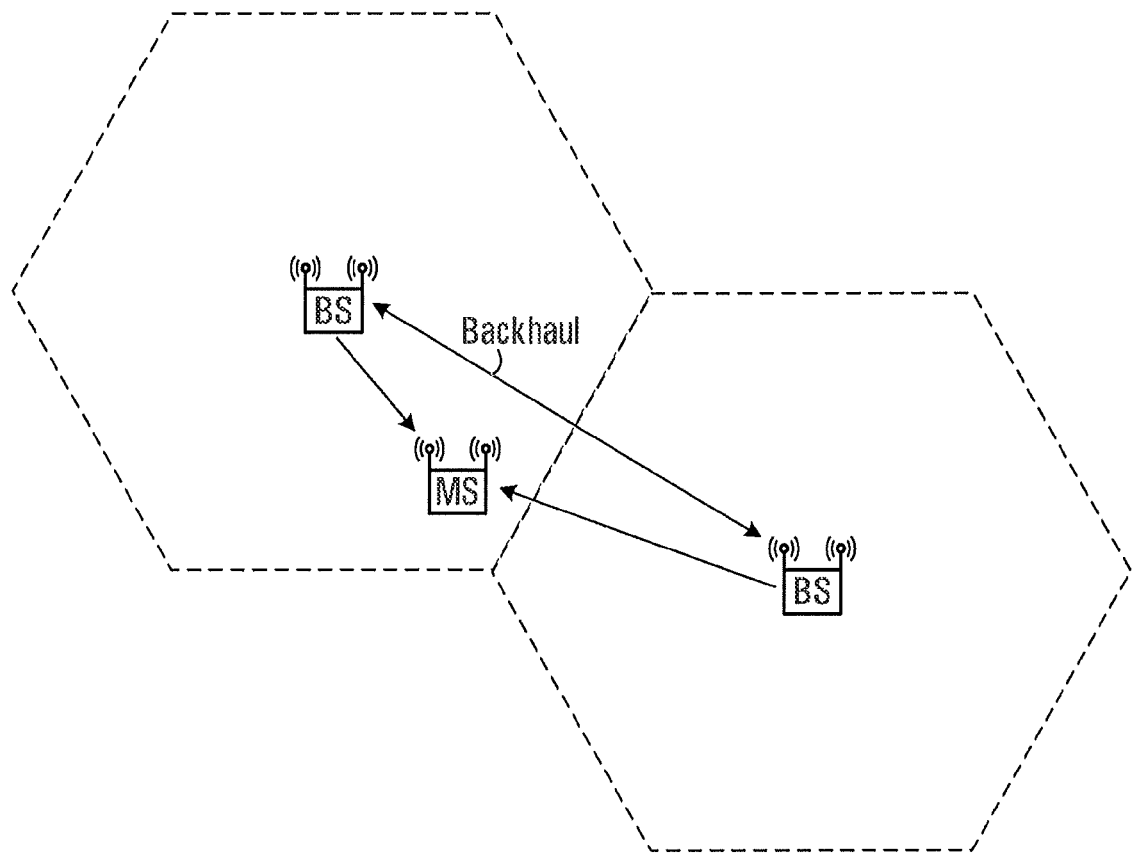
FIG. 8 illustrates NB-NB cooperation.

The cooperating sites may be located to the same cell or located in different cells. With multi-cell cooperation as shown in FIG. 8, all participating sites have access to backhaul and hence allowing for data exchange and CSI exchange. However, this requires a distributed scheduling mechanism that enables cooperation for such cell edge users. See FIG. 8.

Figure 9:
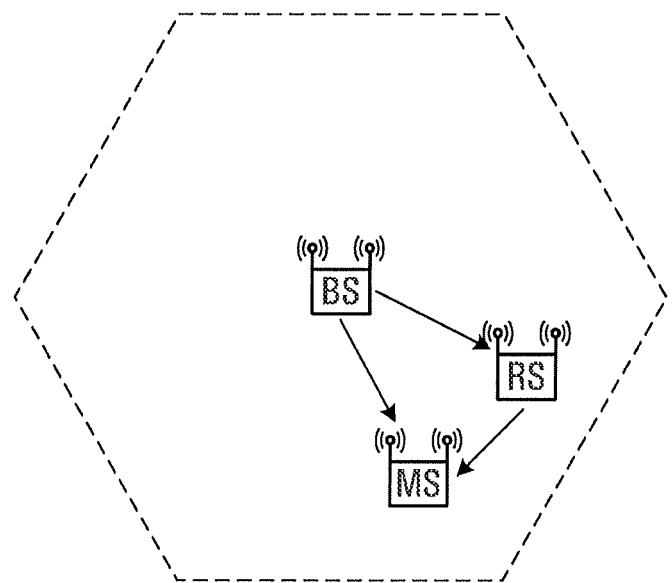
FIG. 9 illustrates NB-relay cooperation.
Figure 10:
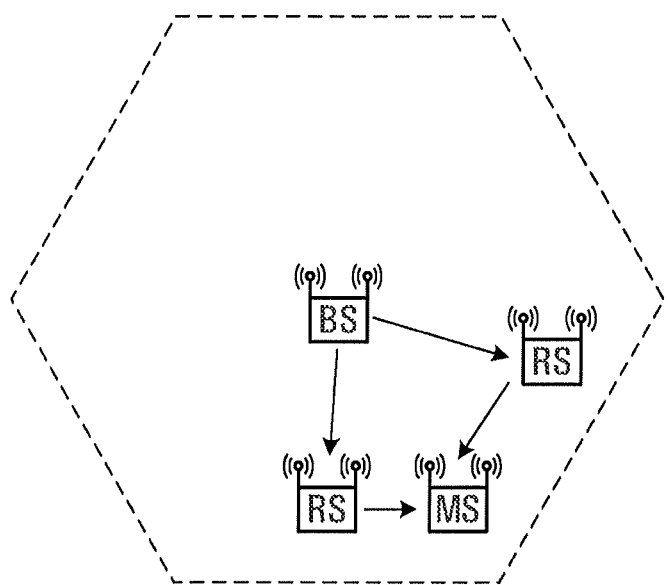
FIG. 10 illustrates relay-relay cooperation.

Same-site cooperation includes NB-relay and relay-relay cooperation as well as distributed antenna setups. In these cases, a centralized scheduler is possible. However, for the case of relays, a mechanism to share data and CSI between the nodes is open for study. See FIGS. 9 and 10.

Antenna setup at the participating sites dictates the available cooperation solutions. With an array antenna, beamforming solutions are possible, while for sites with MIMO antenna setup, cooperation solutions need to extend the LTE-A precoding schemes to multi-site scenarios. Moreover, it is quite possible that for NB-relay and NB-home NB cooperation, the cooperating sites have different antenna setup.

Data and CSI sharing possibility allows for more advanced cooperation techniques. In the NB-NB cooperation, the backhaul latency may limit the cooperation, while in the relay cooperation scenarios, the dominant factor in data and CSIT sharing is overhead.

RS overhead and channel estimation complexity is another aspect to study. While superposition dedicated RS for some solutions maintain the RS overhead and complexity, some solutions require separate channel estimation from different sites for demodulation and/or precoder selection.

3 Cooperation Solutions

Based on the attributes of the cooperating sites, different multi-site cooperation levels are possible. Based on the CSI knowledge at the transmitter, we can generalize the multi-site solutions into three main categories. Open loop, closed loop and semi closed cooperation techniques.

3.1 Open Loop Cooperation Schemes

An open loop cooperation scheme use all the antenna ports at the cooperating sites to maximize the transmit diversity or throughput of the user. In OL cooperation, none of the cooperating sites have access to channel state information and thus, rely on multi-site and/or transmit diversity. For high geometry users, different sites transmit independent data streams to enhance the user experience. These techniques need independent channel estimation from all cooperating sites. Moreover, for the transmit diversity solutions, full data sharing is required.

3.1.1 Band Switching Transmit Diversity

To improve the coverage to the cell edge users, the two (or more) sites specify different bands to the user. The other sites either keep quiet in the specified bands from other sites or send low power data to their own cell centre users. Within the sub-band allocated to each user, a single-site open loop scheme is utilized. The main difference between this technique and FFR is that this technique is enabled through scheduling. Also, to achieve multi-site diversity, the transmitted data from all the sites should come from the same codebook. Without data sharing, there is no multi-site diversity gain and the only remaining gain is interference avoidance.

Band switching transmit diversity is robust against small timing and frequency mismatch between the cooperating sites. However, it achieves the least possible diversity gain.

3.1.2 Tone Switching Transmit Diversity

This technique is similar to band switching transmit diversity except that the tones from different sites are interlaced along time or frequency direction. Therefore, it achieves higher frequency diversity than the former one. However, it makes it more susceptible to synchronization mismatch between the two sites. Similar to other multi-site TxD schemes, the UE should estimate the channel from all the sites. However, this method induces a coloured noise to neighbouring (non-cooperating) cells.

3.1.3 Space-Time/Frequency Transmit Diversity

Similar to single-site transmit diversity, space-time/frequency block codes can achieve high diversity order for all turbo coding rates. However, the total number of antennas in the code increases with the increase in the number of cooperating sites. Hence, bigger S-T/F codes are required. One solution is to reuse the existing transmit diversity schemes and combine single-site S-T/F codes with tone switching similar to the TxD scheme in LTE 4-Tx transmit diversity scheme. Space-tone cooperation between the sites maintains the spectral density of the interference to the neighbouring cells.

3.1.4 Multi-Site Spatial Multiplexing

For UEs with high geometry from more than one site, spatial multiplexing improves the user throughput and also total sector throughput. With multi-site spatial multiplexing, each site sends its own data and there is no need to exchange data between the sites. Moreover, by exploiting a SIC receiver, the total throughput can be further improved. Similar to multi-site TxD schemes, (ignoring the frequency selectivity of channel) the interference to other sites remain white.

3.2 Closed Loop Cooperation Schemes

With access to the channel state information, closed loop cooperation is available between the sites. Depending on the CSI knowledge type, its accuracy and how much this information is shared between the sites, different cooperation solutions are possible. For TDD systems, the uplink sounding channel provides access to the DL channel coefficients. For FFD systems, this information is collected by the user feedback or uplink AoA in array sites. Although for the array sites, the beam-forming matrix does not change fast even for moderate and high speed users, closed loop cooperation between the sites is sensitive to UE movement and hence is limited to fixed and low speed UEs.

3.2.1 Multi-Site Beam-Forming

Sites with array antennas may use the uplink AoA information for closed loop operation. When two array sites cooperate to send the same data to the UE using beam-forming, a mechanism to ensure constructive addition of the two beams is required. For this purpose, a timing/distance adjustment as well as phase correction is required. For demodulation purposes, the two sites can apply superposition dedicated RS to maintain RS overhead and simple decoding.

3.2.1.1 Timing/Distance Adjustment

Timing mismatch between the cooperating sites as well as different distance to the UE results in a mismatch between the arrival times of the signal from different times. This timing mismatch results in a linear phase over frequency. A mechanism to estimate the timing error and correcting it is required.

3.2.1.2 Phase adjustment

After correcting the linear phase between the two beams, the residual phase difference between the two sites needs to be corrected. Unlike the beam-forming precoder which is constant over frequency for each site, the phase difference may change over the band due to residual timing mismatch and channel dispersion. The UE may take one site as the reference and report the phase differences to all other sites.

3.2.2 Multi-Site Closed Loop Precoding

When two or more MIMO sites are cooperating, each site applies precoders to the transmitted signal. Similar to multi-site BF, the goal is to make the signal from all participating sites add constructively at the receiver. Multi-site precoding is less sensitive to timing/distance mismatch compared to the multi-site BF because of the frequency selectivity nature of the precoder. Still, timing adjustment should ensure a relatively constant phase from all sites over the precoding report sub-band size.

3.2.2.1 Individual Precoding Report

The UE may report individual precoding matrices to different sites. This way, the codebook from single-site closed loop is reused. Also, the codeword selection criteria remain the same. However, a phase adjustment between different sites is required similar to multi-site beam-forming.

3.2.2.2 Aggregate Precoding Report

Here, the UE assumes that all the antennas from all the ports are from the same site and find a precoder that best matches the entire antenna set. The UE finds the precoding matrix using a bigger precoder codebook. Each site uses a portion of the precoding matrix corresponding to its antenna ports for transmitting data to the user. By using only one PMI, there is no need for phase adjustment between the sites.

3.2.3 Closed Loop Cooperation Between Array and MIMO Sites

The aforementioned techniques for multi-site cooperation can be extended to cooperation between array and MIMO sites.

3.3 Semi Closed Loop Cooperation Techniques

As mentioned before, closed loop cooperation techniques are sensitive to UE movement, timing and phase mismatches. They also require higher complexity and feedback overhead compared to single-site closed loop schemes. Open loop cooperation between sites each performing a closed loop transmission to the UE is a reasonable compromise that maintains the feedback overhead and complexity while benefiting from multi-site diversity and closed loop gain. While semi closed loop techniques do not achieve the full cooperation gain, they offer the following advantages.

- Easier implementation by reusing single site feedback signaling and closed loop techniques
- No need for beam phase correction
- No need for fine timing/distance adjustment
- Facilitate cooperation between MIMO and array sites
- More robust against channel aging
  - Channel coefficients from the same site age in the same way especially with LoS or array antennas
- More robust against carrier frequency synchronization errors

3.3.1 Multi-Site Beam-Forming Transmit Diversity

Two or more array sites can cooperate to use a transmit diversity scheme (like the Alamouti code) to send the same data stream to the UE. A coarse timing adjustment is enough for beam-forming transmit diversity and no phase correction is required. The drawback of this method is that the UE needs orthogonal dedicated RS from different sites as independent channel estimation from different sites is needed.

3.3.2 Multi-Site Closed Loop Transmit Diversity

Similar to multi-site beam-forming transmit diversity, two or more MIMO sites use a space-time code to transmit data to the UE. Again, the sensitivity to timing errors is very low and there is no need for phase adjustment. The system can reuse the single-site closed loop methods.

3.3.3 Multi-Site Closed-Loop/Beam-Forming SM

Similar to open loop multi-site spatial multiplexing, for high geometry UEs, the cooperating sites send independent data streams to the UE. The UE reports individual precoders to the cooperating sites in the MIMO case. For array antenna setup, the UL AoA information is used for BF purposes. The precoder selection criteria can include minimizing inter-layer interference between different sires.

3.4 Multi-Site Multi-User Cooperatin

Multi-site single user cooperation improves user throughput and coverage at the expense of lower frequency reuse factor. If two (or more) UEs are in the coverage area of the same two (or more) sites, multi-site multi-user cooperation can improve the user experience while benefiting from multi-user techniques to improve total cell throughput.

Interference alignment technique (also called as X-MIMO) can reduce the interference dimension at the users and hence, increase the total number of layers transmitted to the users [5].

SUMMARY

In this contribution, we provided some study points for the cooperation scenarios between different sites and provided some solutions for further study to be adopted by the LTE-A standard. We studied the cooperation in three categories: open loop, closed loop and semi-closed loop. Backhaul overhead to share data and CSI, RS overhead, feedback overhead, complexity and sensitivity to timing error, distance and phase mismatch are among parameters that need to be addressed for different cooperation solutions.

Table 1 provides some details on the requirements on different algorithms and their expected gain.

TABLE 1

Cooperation solutions and requirements

| Scheme | Demodulation RS | RS for precoder selection | Data Exchange | CSI at transmitter | Antenna setup | Note on gain |
|---|---|---|---|---|---|---|
| Band switching transmit diversity | Orthogonal | NA | None or full for Multi-site diversity | None | Both | Interference avoidance + frequency selective scheduling |
| Tone switching transmit diversity | Orthogonal | NA | None or full for Multi-site diversity | None | Both | Interference avoidance + frequency diversity |
| Space/Tone transmit diversity | Orthogonal | NA | Full | None | Both | Spatial diversity |
| OL SM | Orthogonal | NA | None | None | Both | High throughput + SIC |
| Multi-site BF | Superposition dedicated | NA | Full | AoA + phase correction | Array | BF gain |
| Multi-site CL (individual Precoder) | Superposition dedicated or orthogonal common | orthogonal common | Full | Individual precoder report + phase correction + timing adjustment | MIMO | CL gain |
| Multi-site CL (aggregate Precoder) | Superposition dedicated or orthogonal common | orthogonal common | Full | Collective precoder + timing adjustment | MIMO | CL gain (May need bigger precoder set) |
| Heterogeneous multi-site CL/BF | Superposition dedicated | orthogonal common | Full | AoA (array) + precoder (MIMO) + phase correction + timing adjustment | Heterogeneous | BF and CL gain |
| Multi-site CL TxD | orthogonal dedicated or orthogonal common | orthogonal common | Full | Individual precoder (maximize per site power) | MIMO | Multi-site diversity + CL gain |
| Multi-site CL TxD | orthogonal dedicated | NA | Full | AoA | Array | Multi-site diversity + BF gain |
| Multi-site Heterogeneous TxD | orthogonal dedicated or orthogonal common | orthogonal common | Full | Individual precoder + AoA | Both | Multi-site diversity + CL gain + BF gain |
| Multi-site BF SM | Orthogonal dedicated | NA | None | AoA | Array | High throughput + SIC |

TABLE 1-continued

Cooperation solutions and requirements

| Scheme | Demodulation RS | RS for precoder selection | Data Exchange | CSI at transmitter | Antenna setup | Note on gain |
|---|---|---|---|---|---|---|
| Multi-site closed loop SM | orthogonal dedicated or orthogonal common | orthogonal common | None | Individual precoder (minimize interference) | MIMO | High Throughput + SIC |
| Heterogeneous multi-site SM | Orthogonal dedicated or orthogonal common | orthogonal common | None | AoA (array) + precoder (MIMO) | Heterogeneous | High throughput + SIC |
| X-MIMO | Orthogonal dedicated or orthogonal common | orthogonal common | Partial | Channel coefficients | MIMO | Interference alignment + high throughput + SIC |

REFERENCES

[1] Alcatel Shanghai Bell, Alcatel-Lucent, "DL Collaborative MIMO for LTE-A," R1-082812, 3GPP TSG RANI #54, Jeju, Korea, Aug. 18-22, 2008.
[2] Samsung, "Inter-Cell Interference Mitigation through Limited Coordination," R1-082886, 3GPP TSG RANI #54, Jeju, Korea, Aug. 18-22, 2008.
[3] Ericsson, "LTE-Advanced—Coordinated Multipoint transmission/reception," R1-083069, 3GPP TSG RANI #54, Jeju, Korea, Aug. 18-22, 2008.
[4] LG Electronics, "Network MIMO in LTE-Advanced," R1-082942, 3GPP TSG RANI #54, Jeju, Korea, Aug. 18-22, 2008.
[5] M. A. Maddah-Ali, A. S. Motahari, A. K. Khandani, "Communication over MIMO X Channels: Interference Alignment, Decomposition, and Performance Analysis," IEEE Trans. on Information Theory, Volume 54, August 2008, pp. 3457-3470.

WIRELESS SYSTEMS WITH MULTI-TRANSMITTERS AND MULTI-RECEIVERS

Background

Figure 11:
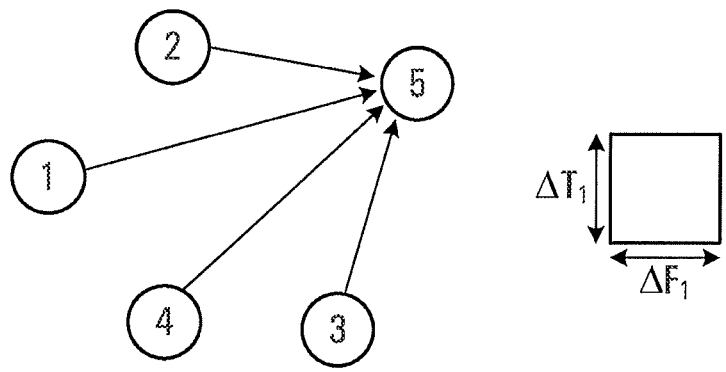
FIG. 11 illustrates a multi-access channel or uplink system.
Figure 12:
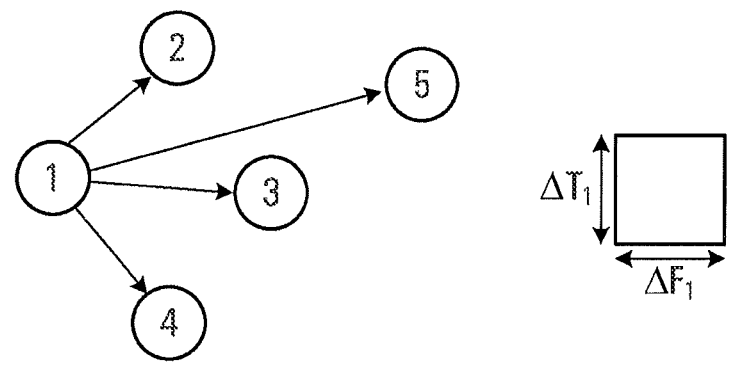
FIG. 12 illustrates a broadcast channel or down-link system.
Figure 13:
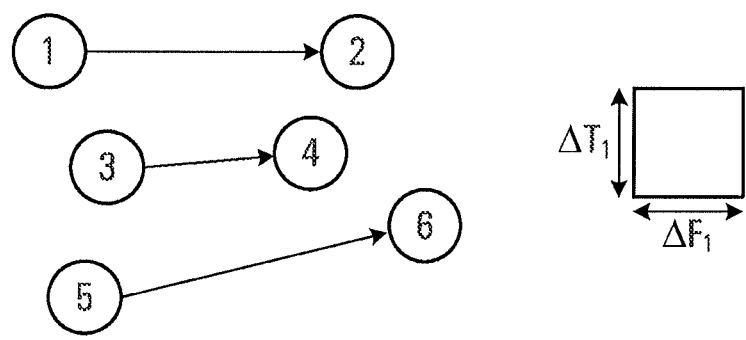
FIG. 13 illustrates an interference channel or concurrent point-to-point communication system.
Figure 14:
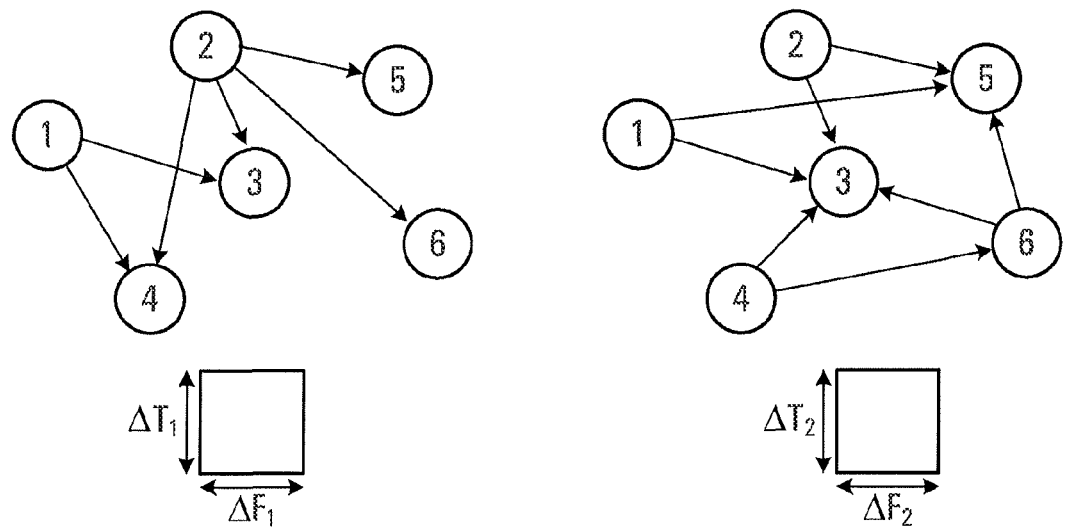
FIG. 14 illustrates a proposed scheme.

Conventionally, in wireless systems, one of the following configurations has been employed:
  Some transmitters send data to only one of the receiver (e.g. Uplink Channel, Multi-access channel)—See FIG. 11,
  Some receivers receive data only from one transmitter (e.g. Downlink Channel, Broadcast Channel)—See FIG. 12.
  Each receiver receives data from one of the intended transmitters (e.g. Interference Channels)—See FIG. 13.
Proposed Scheme
  Here, we propose a new scenario of communication in which in a system with multiple transmitters and receivers (see FIG. 14, wherein in $\Delta T_1$ time slot and in $\Delta F_1$ bandwidth, we have one configuration, while in $\Delta T_2$ time slot and in $\Delta F_2$ bandwidth, we have another configuration)
  Each transmitter transmits data to several receivers.
  Each receiver receives data from several transmitters.
  The transmission can be done at the same time slot and same frequency bandwidth
  In each bandwidth and time slot, the configuration of communication may be different from the configuration of the other bandwidth and time slot.
  Signals transmitted in different time and different frequencies can be dependent or independent
  Example: In the system shown in FIG. 14, we have,
    6 nodes
    In $\Delta T_1$ time slot and in $\Delta F_1$ bandwidth,
      Node 1 sends data to nodes 3 and 4
      Node 2 sends data to nodes 3, 4, 5 and 6
      Node 3 receives data from nodes 1 and 2
      Node 4 receives data from nodes 1 and 2
      Nodes 5 and 6 receive data only from node 2
      Signal transmitted by nodes one and two can be dependent or independent
    In $\Delta T_2$ time slot and in $\Delta F_2$ bandwidth,
      Node 1 sends data to nodes 3 and 5
      Node 2 sends data to nodes 3 and 5.
      Node 6 sends data to nodes 3, 4, and 5.
      Node 3 receives data from nodes 1, 2, and 6.
      Node 4 receives data from nodes 1 and 6.
      Nodes 5 receives data from nodes 1, 2, and 6.
      Signal of the nodes 1,2, and 6 can be dependent or independent
    Signals of the nodes 1 and 2 in $\Delta T_1$ time slot and in $\Delta F_1$ bandwidth and signals of the nodes 1,2, and 6 in $\Delta T_2$ time slot and in $\Delta F_2$ bandwidth can be dependent or independent.

Example

Multi-Antenna Systems

Figure 15:
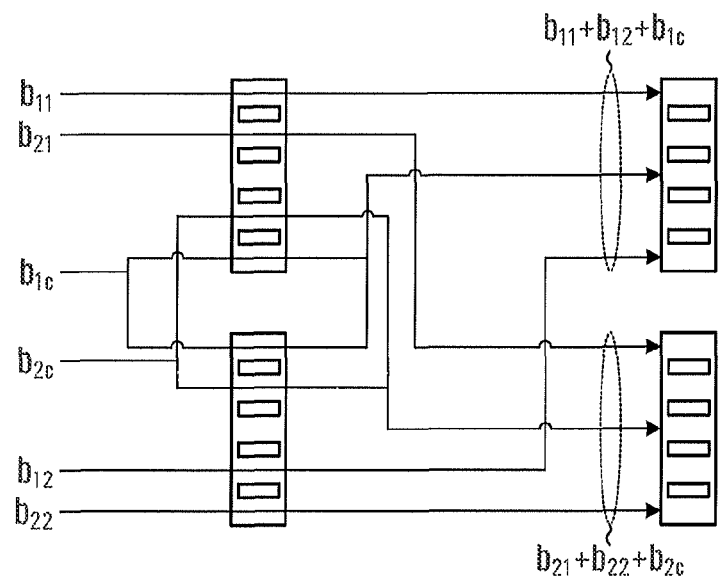
FIG. 15 illustrates a basic configuration for two transmitters and two receivers.

As an example of the proposed scheme, the following scenario has been detailed:
Multiple-Antenna System with Two Transmitters and Two Receivers:
We consider a MIMO system with two transmitters and two receivers, where
  Transmitter t, t=1; 2, is equipped with $m_t$ antennas
  Receiver r, r=1, 2, is equipped with $n_r$ antennas.
  The channel between transmitter t and receiver r is represented by the channel matrix $H_{rt}$, where $H_{rt}$ is a $n_r$ by $m_t$ matrix. The received vector $y_r$ by receiver r, r=1; 2, is given by, $$y_1 = H_{11}s_1 + H_{12}s_2 + w_1 \quad \text{(Eq 1)}$$

$$y_2 = H_{21}s_1 + H_{22}s_2 + w_2 \quad \text{(Eq 2)}$$

where
- $s_t$ represents the transmitted vector by transmitter t
- $w_r$ is noise vector at receiver r
- $y_r$ is the received vector at receiver r In this system (see FIG. 15),
- Transmitter 1 sends $b_{11}$ data streams to receiver one and $b_{21}$ data streams to receiver two
- Transmitter 2 sends $b_{12}$ data streams to receiver one and $b_{22}$ data streams to receiver two.
- Transmitters one and two cooperate to send $b_{1c}$ data streams to receiver one.
- Transmitters one and two cooperate to send $b_{2c}$ data streams to receiver two.
- The six sets of data streams can be dependent or independent.

Example

ZF Scheme

This scheme can be utilized in many applications
  Example: Using multiple relays in downlink (see FIG. 16)
  Example: Using multiple relays in uplink (see FIG. 17)
  Example: Using multiple relays for interference links (See FIG. 18)
To modulate or demodulate the data streams, any linear or non-linear scheme can be applied.
Numbers $b_{rt}$ and $b_{rc}$ can be selected based on design requirements.
As an example, we investigate a scheme based on
  ZF linear pre-preprocessing and post-processing such that the data streams have no interference over each other
In this example, we assume that $n_1=n_2=m_1=m_2=m$.
In this example (See FIG. 19)

$$s_1 = V_{11}d_{11} + V_{12}d_{12} + V_{1c\_1}d_{1c} + V_{2c\_1}d_{2c} \quad (Eq\ 3)$$

$$s_2 = V_{12}d_{12} + V_{22}d_{22} + V_{1c\_2}d_{1c} + V_{2c\_2}d_{2c} \quad (Eq\ 4)$$

Where
- $d_{rt}$ is a $b_{rt}$ dimensional vector, r, t=1,2, which include $b_{rt}$ data streams
- $d_{1c}$ is a $b_{1c}$ dimensional vector, r=1,2, which include $b_{1c}$ data streams
- $d_{2c}$ is a $b_{2c}$ dimensional vector, r=1,2, which include $b_{2c}$ data streams
- $V_{rt}$ is a m times $b_{rt}$ matrix, r, t=1,2 which include $b_{rt}$ data stream
- $V_{1c\_1}$ and $V_{1c\_2}$ are m times $b_{1c}$ matrices
- $V_{2c\_1}$ and $V_{2c\_2}$ are m times $b_{2c}$ matrices
- To decode $d_{rt}$, the received vector $y_r$ is passed through a filter $U_{rt}Q_r$
- To decode $d_{1c}$, the received vector $y_1$ is passed through a filter $U_{1c}Q_1$
- To decode $d_{2c}$, the received vector $y_2$ is passed through a filter $U_{2c}Q_2$ In what follows, the design steps to select system parameter is explained.

Design Steps:
Step 1: Choosing Integers $b_{rt}$, r,t=1,2 and $b_{rc}$, r=1,2
  Select integers $b_{rt}$, r,t=1,2 and $b_{rc}$, r=1,2, such that the following constraints satisfy:

$$b1c: b_{1c} + b_{2c} + b_{22} + b_{21} \leq 2m \quad (Eq\ 5)$$

$$b2c: b_{1c} + b_{2c} + b_{11} + b_{12} \leq 2m \quad (Eq\ 6)$$

$$b11: b_{11} + b_{2c} + b_{22} + b_{21} \leq m \quad (Eq\ 7)$$

$$b12: b_{12} + b_{2c} + b_{22} + b_{21} \leq m \quad (Eq\ 8)$$

$$b21: b_{21} + b_{1c} + b_{11} + b_{12} \leq m \quad (Eq\ 9)$$

$$b22: b_{22} + b_{1c} + b_{11} + b_{12} \leq m \quad (Eq\ 10)$$

$$b_{11} + b_{21} + b_{1c} \leq m \quad (Eq\ 11)$$

$$b_{11} + b_{21} + b_{2c} \leq m \quad (Eq\ 12)$$

$$b_{12} + b_{22} + b_{1c} \leq m \quad (Eq\ 13)$$

$$b_{12} + b_{22} + b_{1c} \leq m \quad (Eq\ 14)$$

$$b_{11} b_{12} + b_{21} + b_{22} + b_{1c} + b_{2c} \leq 2m \quad (Eq\ 15)$$

Remark: Each of the first four inequalities corresponds to one of the parameters $b_{rt}$, $b_{rc}$, r, t=1, 2, in the sense that if $b_{rt}$ or $b_{rc}$ r, t=1; 2, is zero, the corresponding inequality is removed from the set of constraints.

Remark: Based on the application, some new constraint may be added to the system Remark: If in an application, we are not interested in common messages, we can choose $b_{1c}$ and $b_{2c}$ as zero.

Step 2: Choosing Matrices $Q_1$ and $Q_2$
  Choose matrix $Q_1$ as an $(b_{1c}+b_{11}+b_{12})$ times m arbitrary matrix. Similarly, choose matrix $Q_2$ as an $(b_{2c}+b_{21}+b_{22})$ times in arbitrary matrix.
  Remark: $Q_1$ and $Q_2$ can be chosen based on any optimization criteria.

Step 3: Choosing Modulation Matrices:
  Select modulation matrix $V_{11}$ such that columns of $V_{11}$ span null spaces of $Q_2H_{21}$.
  Select Modulation matrix $V_{21}$ such that columns of $V_{21}$ span null spaces of $Q_1H_{11}$.
  Select modulation matrix $V_{12}$ such that columns of $V_{12}$ span null spaces of $Q_2H_{22}$.
  Select modulation matrix $V_{22}$ such that columns of $V_{22}$ span null spaces of $Q_1H_{12}$.
  Select modulation matrices $V_{1c\_1}$ and $V_{1c\_2}$ such that columns of $[(V_{1c\_1})^T, (V_{1c\_2})^T]^T$ span null space of the $[(Q_2H_{21})^T, (Q_2H_{22})^T]^T$.
  Select modulation matrices $V_{2c\_1}$ and $V_{2c\_2}$ such that columns of $[(V_{2c\_1})^T, (V_{2c\_2})^T]^T$ span null space of the $[(Q_1H_{12})^T, (Q_1H_{11})^T]^T$.

Step 4: Choosing Demodulation Matrices:
  $U_{11}$ is selected such that the columns of $U_{11}$ is orthogonal to the columns of $Q_1H_{12}V_{12}$ and $Q_1[H_{11}\ H_{12}][(V_{1c\_1})^T, (V_{1c\_2})^T]^T$.
  $U_{12}$ is selected such that the columns of $U_{12}$ is orthogonal to the columns of $Q_1H_{11}V_{11}$ and $Q_1[H_{11}\ H_{12}][(V_{1c\_1})^T, (V_{1c\_2})^T]^T$.
  $U_{1c}$ is selected such that the columns of $U_{1c}$ is orthogonal to the columns of $Q_1H_{11}V_{11}\ Q_1H_{12}V_{12}$.
  $U_{21}$ is selected such that the columns of $U_{21}$ is orthogonal to the columns of $Q_2H_{22}V_{22}$ and $Q_2[H_{21}\ H_{22}][(V_{2c\_1})^T, (V_{2c\_2})^T]^T$.
  $U_{22}$ is selected such that the columns of $U_{22}$ is orthogonal to the columns of $Q_2H_{21}V_{21}$ and $Q_2[H_{21}\ H_{22}][(V_{2c\_1})^T, (V_{2c\_2})^T]^T$.
  $U_{2c}$ is selected such that the columns of $U_{2c}$ is orthogonal to the columns of $Q_2H_{21}V_{21}$ and $Q_2H_{22}V_{22}$.

Remark: Equations (Eq 5) to (Eq 15) guarantee that we can design such transmit and receive filters.

Remark: The above steps are based on nulling the interference of data streams over each other. Other linear or nonlinear schemes like MMSE scheme, successive decoding, dirty-paper-coding, etc. can be used instead of zero-forcing filters.

Example

ZF Scheme with Frequency Extension

In the above scheme, we assume that each node has m antennas, providing m space dimensions. Apparently, it is possible to provide dimensions using time and frequency resources. In what follows, as an example, we extend the above example to the case, where J frequency sub-bands are also available.

Multiple-Antenna System with Two Transmitters and Two Receivers and J Sub-Bands

Transmitter t, t=1; 2, is equipped with $m_t$ antennas
Receiver r, r=1, 2, is equipped with $n_r$ antennas.

The channel between transmitter t and receiver r is at sub-band j, j=1, ..., J, represented by the channel matrix $H_{rt}(j)$, where $H_{rt}(j)$ is a $n_r$ by $m_t$ complex matrix. The received vector $y_r(j)$ by receiver r, r=1; 2, is given by, $$y_1(j)=H_{11}(j)s_1(j)+H_{12}(j)s_2(j)+w_1(j) \quad \text{(Eq 16)}$$

$$y_2(j)=H_{21}(j)s_1(j)+H_{22}(j)s_2(j)+w_2(j) \quad \text{(Eq 17)}$$

where
$s_t(j)$ represents the transmitted vector by transmitter t at frequency sub-band j
$w_r(j)$ is noise vector at receiver r at frequency sub-band j
$y_r(j)$ is the received vector at receiver r at frequency sub-band j We define $H_{rt}$, $s_t$, and $y_r$ as follows:

$$H_{rt} = \begin{bmatrix} H_{rt}(1) & 0 & 0 & 0 \\ 0 & H_{rt}(2) & 0 & 0 \\ 0 & 0 & \ddots & 0 \\ 0 & 0 & 0 & H_{rt}(J) \end{bmatrix}, s_t = \begin{bmatrix} s_t(1) \\ s_t \\ \vdots \\ s_t(J) \end{bmatrix}, y_r = \begin{bmatrix} y_r(1) \\ y_r(1) \\ \vdots \\ y_r(J) \end{bmatrix}, r, t = 1, 2$$

As an example, here again we use ZF filter desing
In this example we assume that $n_1=n_2=m_1=m_2=m$.
In this example, $$s_1 = V_{11}d_{11} + V_{12}d_{12} + V_{1c\_1}d_{1c} + V_{2c\_1}d_{2c} \quad \text{(Eq 18)}$$

$$s_2 = V_{12}d_{12} + V_{22}d_{22} + V_{1c\_2}d_{1c} + V_{2c\_2}d_{2c} \quad \text{(Eq 19)}$$

Where
  $d_{rt}$ is a $b_{rt}$ dimensional vector, r,t=1,2, which include $b_{rt}$ data streams
  $d_{1c}$ is a $b_{1c}$ dimensional vector, r=1,2, which include $b_{1c}$ data streams
  $d_{2c}$ is a $b_{2c}$ dimensional vector, r=1,2, which include $b_{2c}$ data streams
  $V_{rt}$ is a m times $b_{rt}$ matrix, r,t=1,2 which include $b_{rt}$ data stream
  $V_{1c\_1}$ and $V_{1c\_2}$ are J.m times $b_{1c}$ matrices
  $V_{2c\_1}$ and $V_{2c\_2}$ are J.m times $b_{2c}$ matrices
  To decode $d_{rt}$, the received vector $y_r$ is passed through a filter $U_{rt}Q_r$.
  To decode $d_{1c}$, the received vector $y_1$ is passed through a filter $U_{1c}Q_1$
  To decode $d_{2c}$, the received vector $y_2$ is passed through a filter $U_{2c}Q_2$ Design Steps:
  Step 1: Choosing Integers brt, r,t=1,2 and brc, r=1,2

Select integers brt, r,t=1,2 and brc, r=1,2, such that the following constraints satisfy:

$$b1c: b_{1c}+b_{2c}+b_{22}+b_{21} <= 2J.m \quad \text{(Eq 20)}$$

$$b2c: b_{1c}+b_{2c}+b_{11}+b_{12} <= 2J.m \quad \text{(Eq 21)}$$

$$b11: b_{11}+b_{2c}+b_{22}+b_{21} <= J.m \quad \text{(Eq 22)}$$

$$b12: b_{12}+b_{2c}+b_{22}+b_{21} <= J.m \quad \text{(Eq 23)}$$

$$b21: b_{21}+b_{1c}+b_{11}+b_{12} <= J.m \quad \text{(Eq 24)}$$

$$b22: b_{22}+b_{1c}+b_{11}+b_{12} <= J.m \quad \text{(Eq 25)}$$

$$b_{11}+b_{21}+b_{1c} <= J.m \quad \text{(Eq 26)}$$

$$b_{11}+b_{21}+b_{2c} <= J.m \quad \text{(Eq 27)}$$

$$b_{12}+b_{22}+b_{1c} <= J.m \quad \text{(Eq 28)}$$

$$b_{12}+b_{22}+b_{1c} <= J.m \quad \text{(Eq 29)}$$

$$b_{11}b_{12}+b_{21}+b_{22}+b_{1c}+b_{2c} <= 2J.m \quad \text{(Eq 30)}$$

Remark: Each of the first four inequalities corresponds to one of the parameters $b_{rt}$, $b_{rc}$, r, t=1, 2 in the sense that if $b_{rt}$ or $b_{rc}$ r, t=1; 2, is zero, the corresponding inequality is removed from the set of constraints.

Remark: Based on the application of the proposed scheme, some new constraint may be added to the system Remark: If based on the application, we are not interested in common messages, we can choose $b_{1c}$ and $b_{2c}$ as zero.

Step 2: Choosing matrices $Q_1$ and $Q_2$
  choose matrix $Q_1$, as an $(b_{1c}+b_{11}+b_{12})$ times in arbitrary matrix. Similarly, choose matrix $Q_2$ as an $(b_{2c}+b_{21}+b_{22})$ times In arbitrary matrix.
  Remark: $Q_1$ and $Q_2$ can be chosen based on any optimizing criteria Step 3: Choosing Modulation Matrices:
  Select modulation matrix $V_{11}$ such that columns of $V_{11}$ span null spaces of $Q_2H_{21}$.
  Select Modulation matrix $V_{21}$ such that columns of $V_{21}$ span null spaces of $Q_1H_{11}$.
  Select modulation matrix $V_{12}$ such that columns of $V_{12}$ span null spaces of $Q_2H_{22}$.
  Select modulation matrix $V_{22}$ such that columns of $V_{22}$ span null spaces of $Q_1H_{12}$.
  Select modulation matrices $V_{1c\_1}$ and $V_{1c\_2}$ such that columns of $[(V_{1c\_1})^T, (V_{1c\_2})^T]^T$ span null space of the $[(Q_2H_{21})^T, (Q_2H_{22})^T]^T$.
  Select modulation matrices $V_{2c\_1}$ and $V_{2c\_2}$ such that columns of $[(V_{2c\_1})^T, (V_{2c\_2})^T]^T$ span null space of the $[(Q_1H_{12})^T, (Q_1H_{11})^T]^T$.

Step 4: Choosing Demodulation Matrices:
  $U_{11}$ is selected such that the columns of $U_{11}$ is orthogonal to the columns of $Q_1H_{12}V_{12}$ and $Q_1[H_{11}H_{12}][(V_{1c\_1})^T,(V_{1c\_2})^T]^T$.
  $U_{12}$ is selected such that the columns of $U_{12}$ is orthogonal to the columns of $Q_1H_{11}V_{11}$ and $Q_1[H_{11}H_{12}][(V_{1c\_1})^T,(V_{1c\_2})^T]^T$.
  $U_{1c}$ is selected such that the columns of $U_{1c}$ is orthogonal to the columns of $Q_1H_{11}V_{11}$ and $Q_1H_{12}V_{12}$.
  $U_{21}$ is selected such that the columns of $U_{21}$ is orthogonal to the columns of $Q_2H_{22}V_{22}$ and $Q_2[H_{21}H_{22}][(V_{2c\_1})^T,(V_{2c\_2})^T]^T$.
  $U_{22}$ is selected such that the columns of $U_{22}$ is orthogonal to the columns of $Q_2H_{21}V_{21}$ and $Q_2[H_{21}H_{22}][(V_{2c\_1})^T,(V_{2c\_2})^T]^T$.

$U_{2c}$ is selected such that the columns of $U_{2c}$ is orthogonal to the columns of $Q_2H_{21}V_{21}$ and $Q_2H_{22}V_{22}$.

Remark: Remark: (Eq 20) to (Eq 30) guarantee that we can design such transmit and receive filters.

Advantage of the Proposed Scheme

One show the advantage of the proposed scenario, we consider a downlink system with One base station with 8 antennas (or 8 available dimensions)

Two relays each with 4 antennas

To receiver each with 4 antennas

Consider a period of time T.

In what follows, we evaluate three signaling schemes and compare the overall rate achieved by each schemes.

Scheme One: Conventional Scheme

In time period [0, T/3], base station simultaneously sends 4 data streams, intended for receiver one, to relay one 4 data streams, intended for receiver two, to relay two In time period [T/3,2 T/3], relay one sends 4 data streams to receiver one.

In time period [2 T/3,T], relay two sends 4 data streams to receiver two.

The overall throughput of this scheme is $8/3 \log(P_T)$, where $P_T$ represents total power.

Remark: This is the best achievable rate with conventional scheme.

Remark: The overall incoming data streams by each relay is the same as the overall outgoing data streams.

Scheme Two: Proposed Scheme where Signals of the Relays are Correlated

In time period [0,T/2], base station simultaneously sends

One data stream, intended to receiver one, to relay one,

One data stream, intended to receiver one, to relay two,

One data stream, intended to receiver two, to relay one,

One data stream, intended to receiver two, to relay two,

One data stream, intended to receiver one, to both relays,

One data stream, intended to receiver two, to both relays,

In time period [T/2,T], relays one and two, send data simultaneously to receiver one and two, based on proposed scheme with $b_{11}=b_{12}=b_{21}=b_{22}=b_{1c}=b_{2c}=1$.

The overall throughput of this scheme is $3 \log(P_T)$, where $P_T$ represents total power.

Remark: The overall incoming data streams by each relay is the same as the overall outgoing data streams.

Scheme Three: Proposed Scheme where the Signals of the Relays are Uncorrelated

In time period [0,2 T/5], base station simultaneously sends

Two data streams, intended to receiver one, to relay one,

Two data streams, intended to receiver one, to relay two,

Two data streams, intended to receiver two, to relay one,

Two data streams, intended to receiver two, to relay two,

In time period [2 T/5,T], relays one and two, send data simultaneously to receiver one and two, based on proposed scheme in with $b_{11}=b_{12}=b_{21}=b_{22}=4$, $b_{1c}=b_{2c}=0$, and J=3.

The overall throughput of this scheme is $16/5 \log(P_T)$, where $P_T$ represents total power.

Remark: The overall incoming data streams by each relay is the same as the overall outgoing data streams.

It is clear from this example that scheme two and three which are based on the proposed scheme perform better than conventional schemes.

Key Features

The proposed scenario of Communication improves the performance of the communication systems in terms of overall throughput, reliability, and coverage.

To design such system, we can use any linear or non-linear filters based on the design requirements.

The ZF scheme, presented in detail, can be applied simply to improve the performance of the communication system.

The ZF scheme, presented here, can be generalized to any number of transmitters and receivers, to support any number of transmitters and receivers.

The processing, designed based on ZF scheme, can be employed and redesigned based on other known scheme such as dirty-paper coding, successive decoding, MMSE filters, etc.

Figure 16:
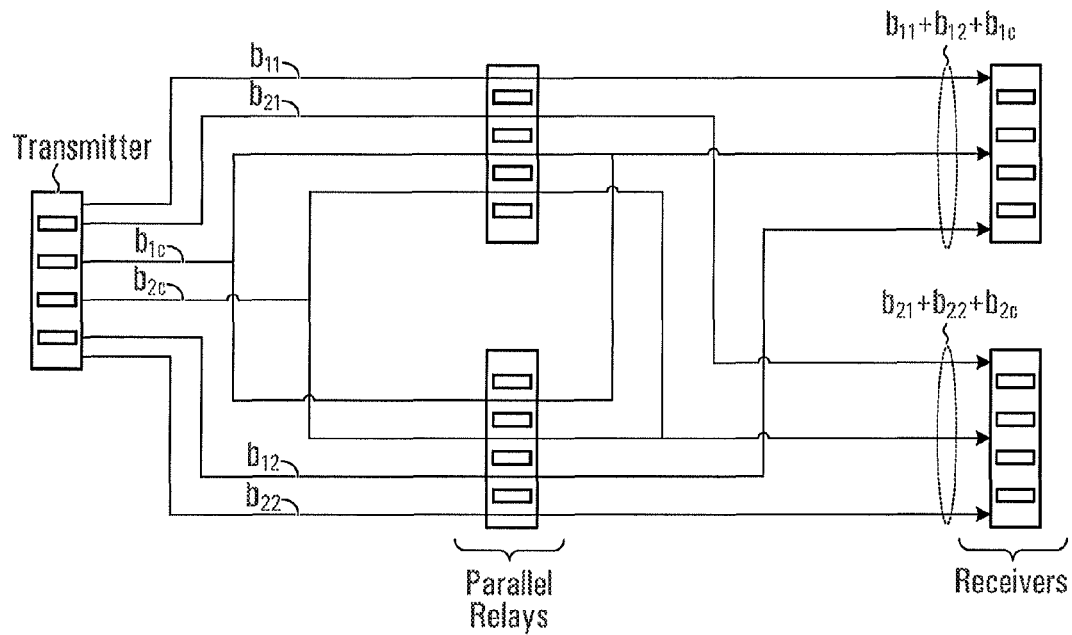
FIG. 16 illustrates an application of the proposed scheme in MIMO downlink with parallel relays.
Figure 17:
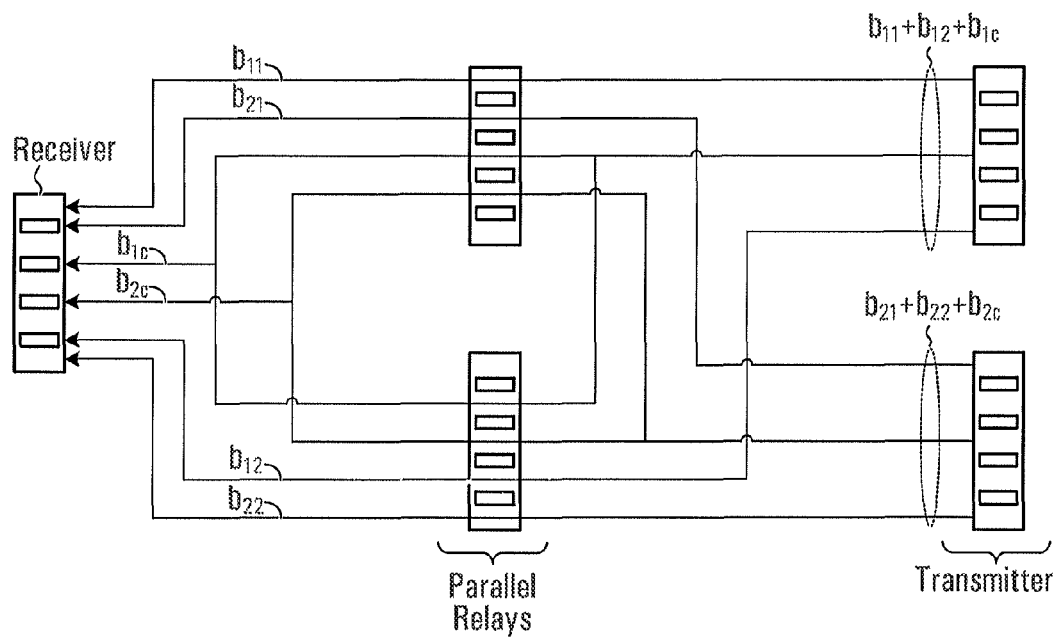
FIG. 17 illustrates an application of the proposed scheme in MIMO uplink with parallel relays.
Figure 18:
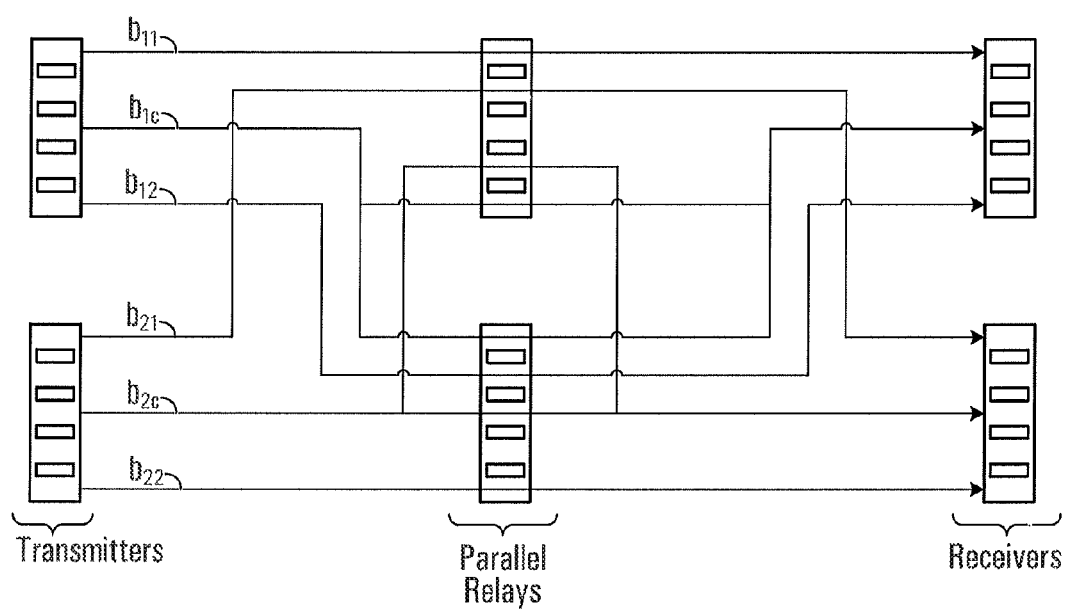
FIG. 18 illustrates an application of the proposed scheme in MIMO interference channels with parallel relays.
Figure 19:
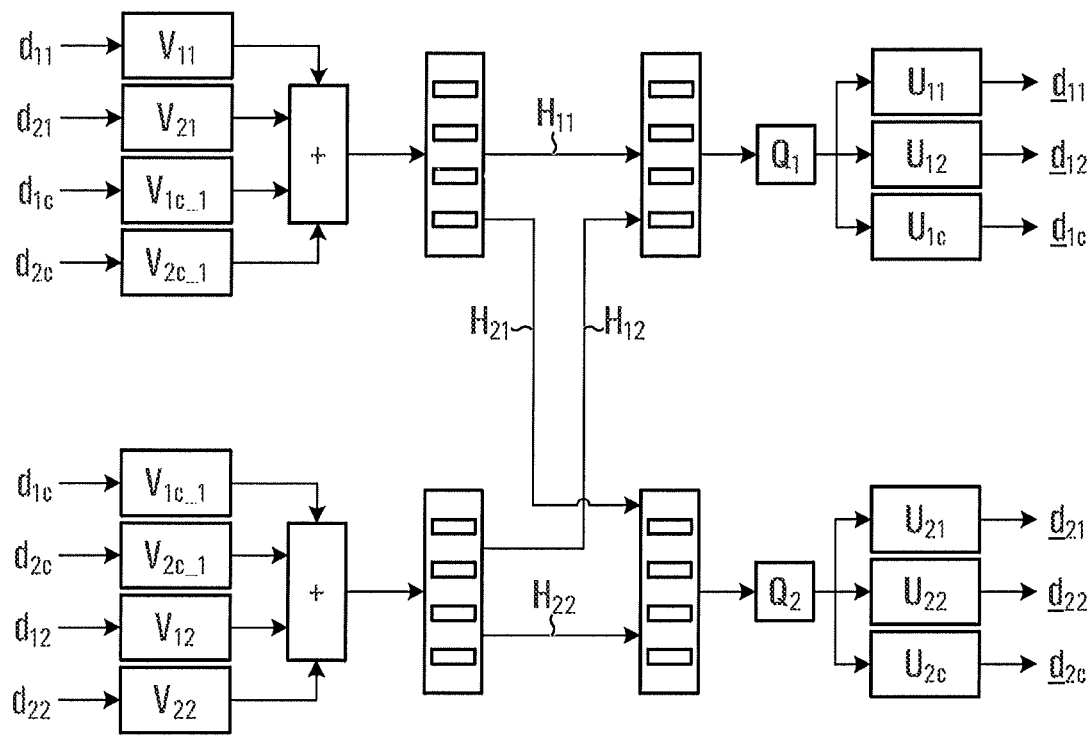
FIG. 19 illustrates an example for signaling scheme for the proposed scenario based on zero-forcing scheme.

The communication schemes shown in FIG. 16 (uplink system with parallel relays), FIG. 17 (downlink system with parallel relays), and FIG. 18 (Interference channel with parallel relays) are helpful in wireless communication systems. This configurations can be generalized to support any number of transmitters, relays, and receivers. At relay nodes, any scheme such as decode-and-forward. Amplify-and-forward, etc, can be employed.

X-MIMO Systems with Multi-Transmitters and Multi-Receivers

Brief Description of the Gist of the Application

This Application provides a solution for MP-to-MP MIMO systems to increase the spectral efficiency by coordinating the interference.

The interference arriving at each receive node is coordinated on the same subspace, so the signal subspace is expanded→higher number of streams.

Method requirements/procedure

Each transmitter has the knowledge of its MIMO channel information.

No data-exchanging required between the transmitters, and no data-exchanging in the receiver side (non cooperative transmission/reception).

Brief Statement of the Value to Nortel of the Application

The basic scheme of X-MIMO can be generalized to many wireless application, such as multi-hop relay, distributed MIMO networking.

Previous Art:

Network MIMO: using an additional backbone system to connect transmitters or receivers which enable us to apply advance schemes such as dirty paper precoding. Requires data exchange between transmitters.

Using more transmit/receive antennas for a given number of data streams.

X-MIMO Basic Elements

Each transmitter sends the pilot for each antenna and the pilot for each transmitter is orthogonal.

Each receiver estimates all the incoming MIMO channels

It computes the specific receive filters and feeds back the compound filter and MIMO channel to a specific transmitter.

Each transmitter computes the linear pre-coding filter based on such feedback information from the receiver.

Each transmitter sends the pre-coded data.

Each receiver demodulates the corresponding data from filtered receive signal

Identify the Products in which the Application May be Used

This Application can be used as Nortel-specific proprietary implementation.

Enterprise solution.

Wireless backhaul

It can be standardized in the next generation broadband wireless standards.

Nomadic multi-user soft handoff

BS/Relay Cooperation

Figure 20:
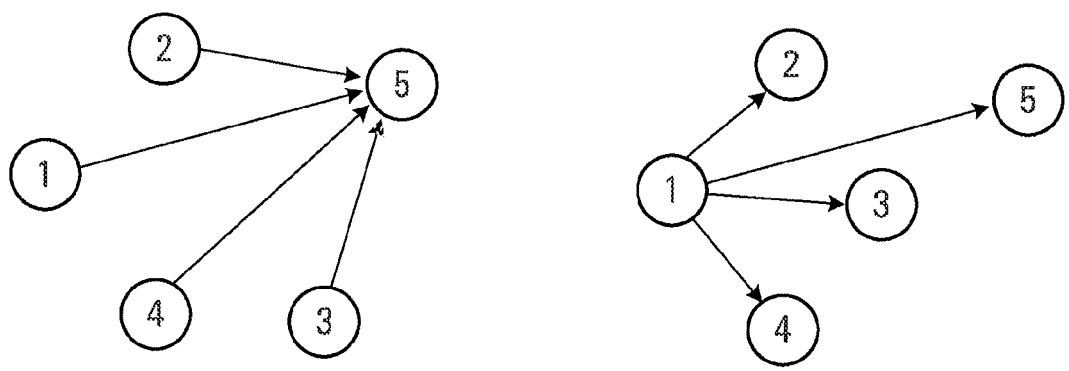
FIG. 20 illustrates multipoint-to-point and point-to-multipoint communication.
Figure 21:
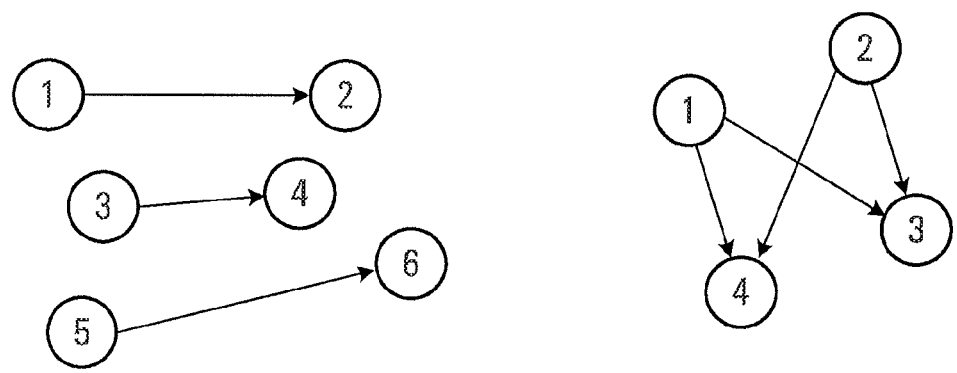
FIG. 21 illustrates interference channel or concurrent point-to-point and X-MIMO.

List of Key Features
  This method enables the X-MIMO channels to minimize the dimensions of the interference.
  It maximizes the number of communication streams over the channel for a given number of antennas.
  The processing can be employed and redesigned based on different schemes such as dirty-paper coding, successive decoding, MMSE filters, ZF, etc.
  This method requires no data communication or CSI exchange between transmitters.
  The communication schemes such as uplink system with parallel relays, downlink system with parallel relays and Interference channel with parallel relays are some examples of the application of the proposed method in wireless systems and can be generalized to support any number of transmitters, relays, and receivers.
Backups
  Background
    Wireless system configurations.
    CL MIMO
    CL Network MIMO
    X-MIMO
    Examples of the advantages of the proposed method
Wireless System Configurations
  Conventionally, in wireless systems, one of the following configurations has been employed:
    One transmitter sends data to one receiver.
    Some transmitters send data to only one of the receiver (e.g. Uplink Channel, Multi-access channel).
    Some receivers receive data only from one transmitter (e.g. Downlink Channel, Broadcast Channel).
    Each receiver receives data from one of the intended transmitters (e.g. Interference Channels).
CL Mimo
See FIGS. 20 and 21.
  Point-to-point: there is only one transmitter and one receiver.
    The transmitter selects a precoder based on the channel.
    Requires channel knowledge at the transmitter.
    The maximum number of streams is min(nTx,nRx)
  Point-to-multipoint: there is only one transmitter but a few receivers.
    The transmitter selects a precoder based on the compound channel.
      The goal is to minimize the interference among receivers.
    Requires channel knowledge at the transmitter.
    The maximum total number of streams is min(nTx, lnRx)
CL Network Mimo
  Multiple transmitters and multiple receivers.
  Transmitters communicate over a backbone and exchange data and/or CSI
  The maximum total number of streams is min($\Sigma$nTx,$\Sigma$nRx)
X-Mimo
  Here, we propose a new scenario of communication in which in a system with multiple transmitters and receivers
    Each transmitter transmits data to several receivers,
    Each receiver receives data from several transmitters,
    The transmission can be done at the same time slot and same frequency bandwidth
    In each bandwidth and time slot, the configuration of communication may be different from the configuration of the other bandwidth and time slot.
    Signals transmitted in different time and different frequencies can be dependent or independent Example Two transmitters and two receivers close to each other (strong interference).
  The total number of layers with the conventional method is 3.
    2-layers for link 1 and 1-layer for link 2 (or vice versa)
      Receiver one cancels one layer and decodes two layers.
      Receiver two cancels two layers and decodes one layer.
  With proposed method and using ZF, the total number of layers are 4.
    Each transmitter sends a layer to receiver one and one layer to receiver 2.
    Each decoder cancels two layers of coordinated interference and decodes two layers.
      The two interferences at each node are coordinated, seen as only one interference stream.

Advantage of the Proposed Scheme

Example

Figure 22:
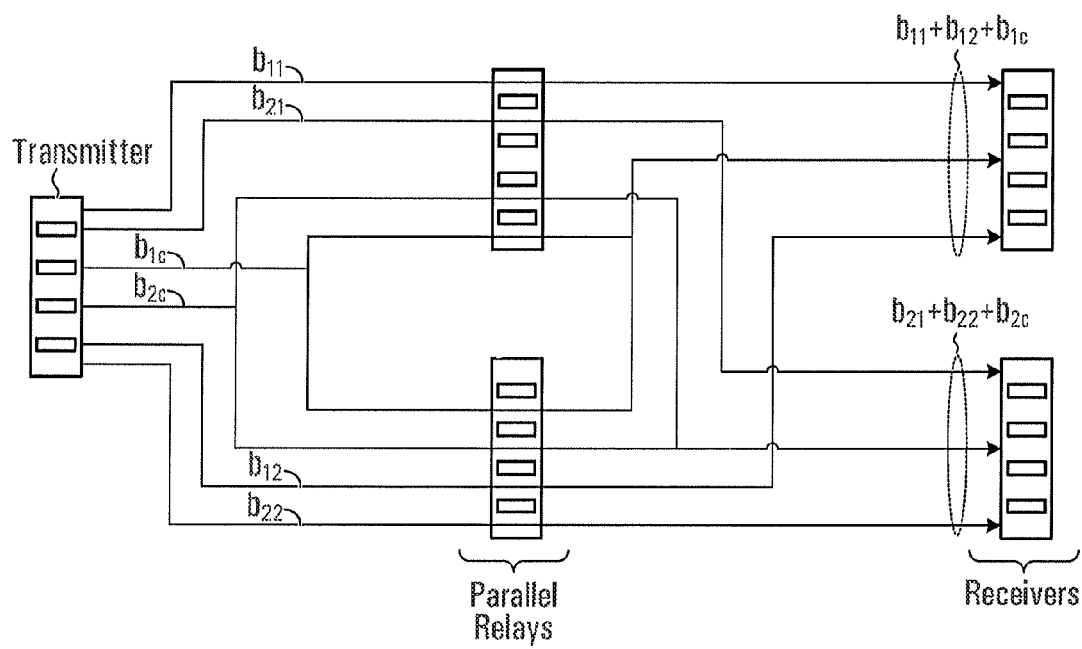
FIG. 22 illustrates an application in downlink with parallel relays.

Consider a downlink system with
  One base station with 8 antennas (or 8 available dimensions)
  Two relays each with 4 antennas
  To receiver each with 4 antennas
Consider a period of time T
In what follows, we evaluate three signaling schemes and compare the overall rate achieved by each schemes. See FIG. 22.
Scheme One: Conventional Scheme
  In time period [0,T/3], base station simultaneously sends
    4 data streams, intended for receiver one, to relay one
    4 data streams, intended for receiver two, to relay two
  In time period [T/3,2 T/3], relay one sends 4 data streams to receiver one.
  In time period [2 T/3,T], relay two sends 4 data streams to receiver two.
  The overall throughput of this scheme is 8/3 log($P_T$), where $P_T$ represents total power.
  Remark: This is the best achievable rate with conventional scheme.
  Remark: The overall incoming data streams by each relay is the same as the overall outgoing data streams.
Scheme 2: X-Mimo with where Signals of the Relays are Correlated
  In time period [0,T/2], base station simultaneously sends
    One data stream, intended to receiver one, to relay one,
    One data stream, intended to receiver one, to relay two,
    One data stream, intended to receiver two, to relay one,
    One data stream, intended to receiver two, to relay two,
    One data stream, intended to receiver one, to both relays,
    One data stream, intended to receiver two, to both relays,
  In time period [T/2,T], relays one and two, send data simultaneously to receiver one and two, based on proposed scheme with $b_{11}=b_{12}=b_{21}=b_{22}=b_{1c}=b_{2c}=1$.
  The overall throughput of this scheme is 3 log($P_T$), where $P_T$ represents total power.
Remark: The overall incoming data streams by each relay is the same as the overall outgoing data streams.
Scheme 2: X-Mimo with where Signals of the Relays are Uncorrelated
  In time period [0,2 T/5], base station simultaneously sends
    Two data streams, intended to receiver one, to relay one,
    Two data streams, intended to receiver one, to relay two,
    Two data streams, intended to receiver two, to relay one,
    Two data streams, intended to receiver two, to relay two, In time period [2 T/5,T], relays one and two, send data simultaneously to receiver one and two, based on proposed scheme in with $b_{11}=b_{12}=b_{21}=b_{22}=4$, $b_{1c}=b_{2c}=0$, and J=3.

The overall throughput of this scheme is $16/5 \log(P_T)$, where $P_T$ represents total power.

Remark: The overall incoming data streams by each relay is the same as the overall outgoing data streams.

It is clear from this example that scheme two and three which are based on the proposed scheme perform better than conventional schemes.

Figure 23:
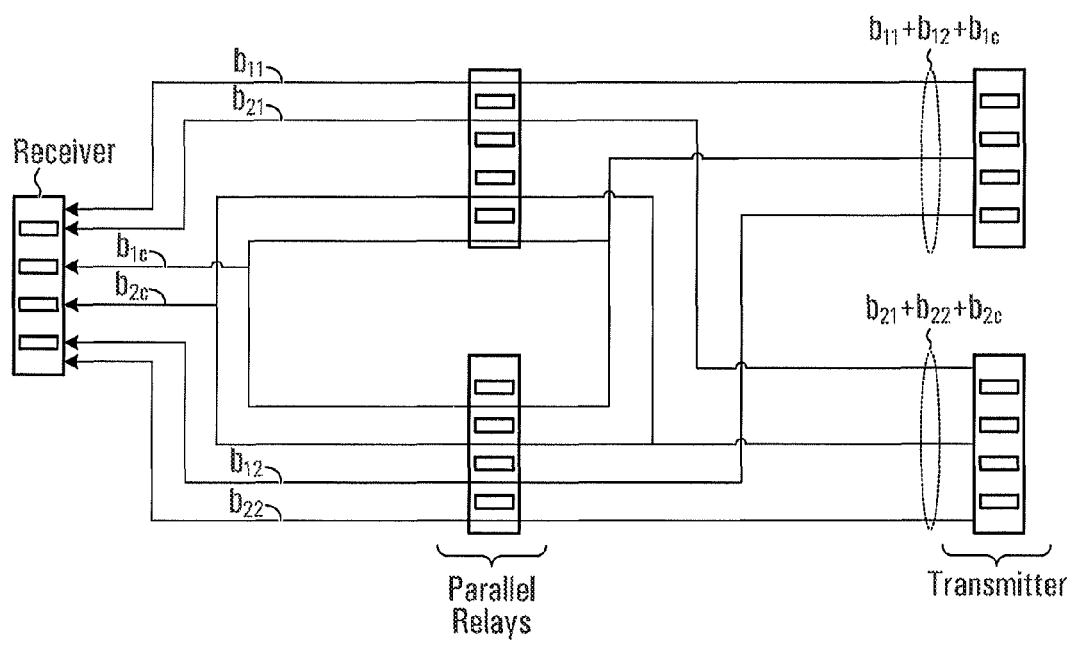
FIG. 23 illustrates an application in uplink with parallel relays.
Figure 24:
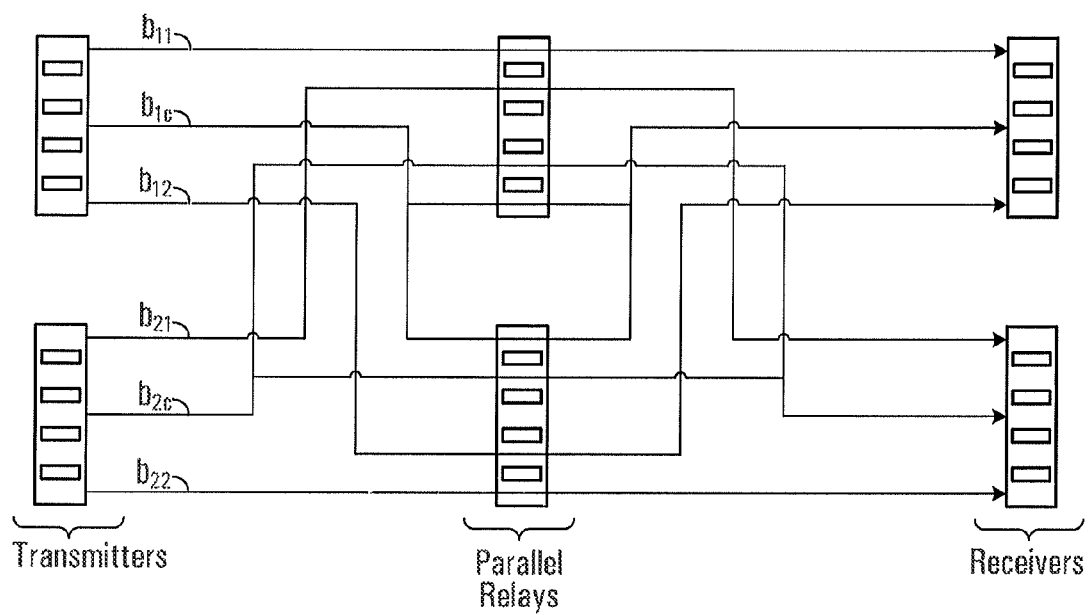
FIG. 24 illustrates an application in interference channels with parallel relays.

See FIGS. 23 and 24.

The invention claimed is:

1. For use in a wireless communication system having a plurality of nodes, each node having multiple antennas, a relay station comprising:
   receive circuitry configured to receive first and second data streams from respective first and second nodes;
   a receive filter configured to decode each of said first and second data streams; and
   transmit circuitry configured to transmit receive filter information for each of said first and second data streams, said receive filter information facilitating precoding of simultaneous transmissions within a common frequency band to said relay station.

2. The relay station of claim 1, wherein the receive filter comprises a minimum mean squared error filter.

3. The relay station of claim 1, wherein the receive filter comprises a zero forcing filter.

4. The relay station of claim 1, wherein the wireless communication system in a Long Term Evolution (LTE) system.

5. The relay station of claim 1, wherein the receive filter information for each of said first and second data streams is associated with a compound filter.

6. The relay station of claim 1, wherein the first and second data streams include pilot signals.

7. The relay station of claim 6, wherein the receive filter is configured based on the pilot signals.

8. For use in a wireless communication system having a plurality of nodes, each node having multiple antennas, a method in a relay station comprising:
   receiving first and second data streams from respective first and second nodes;
   generating a receive filter for decoding each of said first and second data streams; and
   transmitting receive filter information for each of said first and second data streams, said receive filter information facilitating precoding of simultaneous transmissions within a common frequency band to said relay station.

9. The method of claim 8, wherein the receive filter comprises a minimum mean squared error filter.

10. The method of claim 8, wherein the receive filter comprises a zero forcing filter.

11. The method of claim 8, wherein the wireless communication system in a Long Term Evolution (LTE) system.

12. The method of claim 8, wherein the receive filter information for each of said first and second data streams is associated with a compound filter.

13. The method of claim 8, wherein the first and second data streams include pilot signals.

14. The method of claim 13, wherein the receive filter is generated based on the pilot signals.

* * * * *